W. W. LOWDEN.
SHOCK AND VIBRATION ABSORBING MEANS FOR VEHICLES.
APPLICATION FILED NOV. 20, 1915.

1,185,812. Patented June 6, 1916.

Witnesses
Thos. W. Riley
C. S. Frye

Inventor
W. W. Lowden
By W. J. Fitzgerald
Attorney

UNITED STATES PATENT OFFICE.

WALTER W. LOWDEN, OF THE DALLES, OREGON.

SHOCK AND VIBRATION ABSORBING MEANS FOR VEHICLES.

1,185,812.      Specification of Letters Patent.      Patented June 6, 1916.

Application filed November 20, 1915. Serial No. 62,523.

*To all whom it may concern:*

Be it known that I, WALTER W. LOWDEN, a citizen of the United States, residing at The Dalles, in the county of Wasco and State of Oregon, have invented certain new and useful Improvements in Shock and Vibration Absorbing Means for Vehicles; and I do hereby declare the following to be a full, clear, and exact description of the invention, such as will enable others skilled in the art to which it appertains to make and use the same.

My invention relates to new and useful improvements in shock and vibration absorbing means for vehicles, and my object is to provide a movable boxing for the reception of the axle of the vehicle.

A further object is to provide a casing for the reception of the boxing.

A further object is to provide means for compensating for any wear upon the boxing or casing therefor.

A further object is to provide a spring member and attach the same to the upper end of the boxing. And a further object is to provide adjustable means for attaching the ends of the spring to the frame of the vehicle.

Other objects and advantages will be hereinafter set forth and more particularly pointed out in the accompanying specification.

Figure 1:
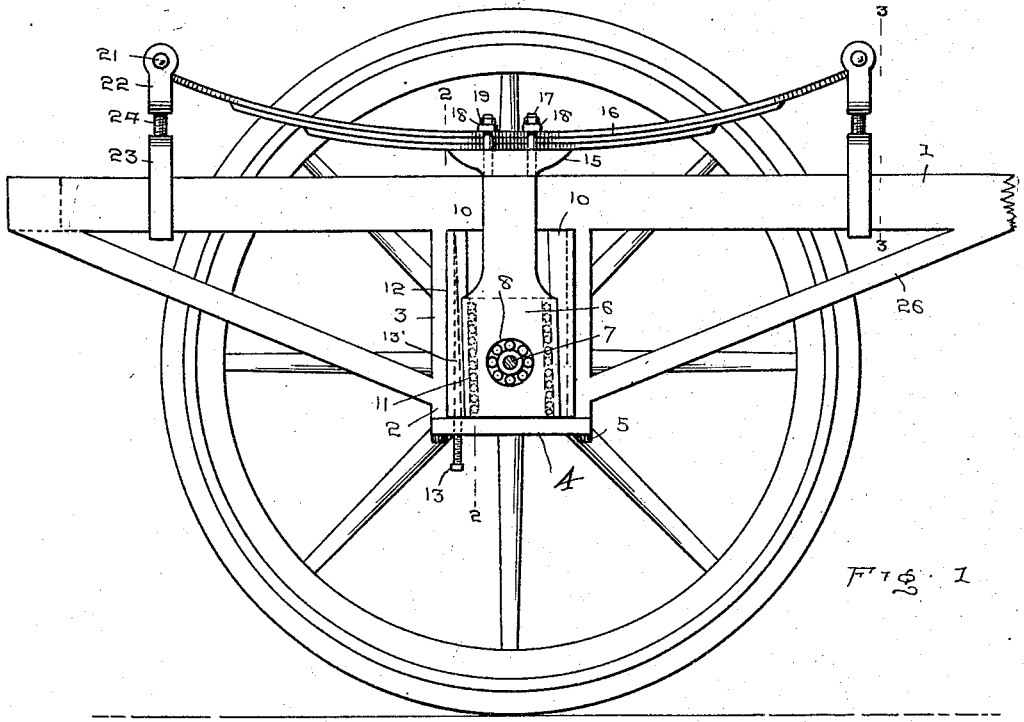
Figure 2:
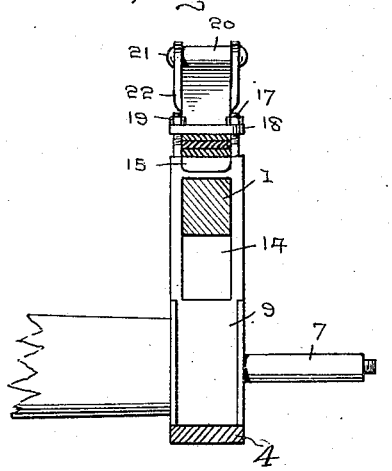
Figure 3:
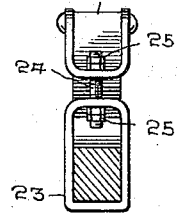
Figure 4:
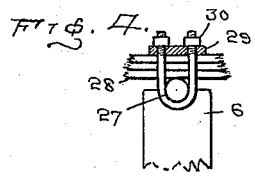

In the accompanying drawings which are made a part of this application, Figure 1 is an elevation of the rear end of a vehicle frame or chassis, showing my improved attachment applied thereto. Fig. 2 is a detail sectional view as seen on line 2—2 of Fig. 1. Fig. 3 is a detail sectional view as seen on line 3—3 of Fig. 1, and Fig. 4 is a detail elevation of a modified means for attaching the housing to the shock absorbing spring.

Referring to the drawings in which similar reference numerals designate corresponding parts throughout the several views, 1 indicates the frame or chassis of the vehicle which may be constructed in any preferred manner from which depends a casing 2 comprising vertical bars 3 and a connecting plate 4, said plate being attached to the lower ends of the bars in any suitable manner as by means of bolts 5.

Slidably mounted between vertical bars 3 is a boxing 6 through which extends the axle 7 of the vehicle, said boxing preferably containing ball bearings 8 for engagement with the axle. The vertical edges of the boxing 6 are provided with grooves 9 with which engage wear plates 10, the edges of the wear plates engaging the grooves being preferably provided with roller bearings 11 while the opposite edges thereof are provided with grooves 12 for the reception of the vertical bars 3. One of the wear plates 10 is tapered on one face to give a wedging action against the boxing 6 and a wedge 13′ is introduced between said tapered face and the face of the bar 3 so that when the wedge is moved upwardly any wear between the boxing and wear plate will be taken up. The wedge 13′ is adjusted vertically through the medium of an adjusting bolt 13 which is threaded through the connecting plate 4 and engages the lower end of the wedge, and it will be readily apparent that when said bolt is turned upwardly through the connecting plate, said wedge will be likewise moved upwardly.

The upper end of the boxing 6 is provided with an elongated slot 14 through which extends the bar of the frame 1, said slot being of sufficient length to permit vertical movement of the boxing without interfering with the frame. Above the frame 1 the end of the boxing is formed into a head or bearing 15 to which is attached a spring 16 preferably of multiple leaf formation, said spring being held in firm engagement with the head by extending bolts 17 upwardly from said head on opposite sides of the spring and extending straps 18 across the spring, the ends thereof engaging the bolts 17 and being held in position thereon by nuts 19. The ends of the spring are preferably curved upwardly and bent to form loops 20 through which extend pins 21. said pins pivotally attaching the ends of the spring to the arms of clevises 22, said clevises being in turn engaged with the frame 1 through the medium of links 23, said links surrounding the bar of the frame and formed of sufficient length to allow vertical movement of the links with respect to the frame. The clevises are adjustably attached to the links by introducing threaded rods 24 through the walls of the clevises and links, said rods having right and left hand threads to receive adjusting nuts 25 and by attaching the clevises to the links in this manner, the tension of the spring may be readily regulated.

To relieve undue strain upon the axle of the vehicle, especially the one containing the driving wheels and also upon the vertical bars of the casing, brace arms 26 are extended from each of the vertical bars into engagement with parts of the frame 1, said brace arms preferably engaging the vertical bars adjacent their lower ends.

As shown in Fig. 4 of the drawing, instead of providing a head at the upper end of the boxing, said end is provided with a transverse groove in which is entered a circular shaft 27, said shaft being attached to the spring in any suitable manner, as by means of clevises 28, a plate 29 and nuts 30, this manner of mounting the spring allowing a slight rocking motion of the spring. The prime object of the spring is to absorb any jars or vibration transmitted by the wheels to the axle and thus prevent the same from being transmitted to the frame or chasis of the vehicle so that solid wheels may be used and the same cushioning effect derived therefrom as when a pneumatic tire is used. To this end therefore, it will be readily seen that any jar received by the wheel of the vehicle will cause the boxing to move upwardly, thus increasing the tension of the spring and causing the same to absorb the shock or vibration. I also desire it to be understood that while I have shown but one boxing and coöperating spring, that there is to be a similar device at both ends of the front and rear axles of the vehicle.

Having thus fully described my invention what I claim as new and desire to secure by Letters Patent of the United States is:—

1. The combination with a frame having a casing and a supporting axle, of a boxing to receive said axle, said boxing having grooves in its vertical edges, roller bearings in said grooves, wear plates between said boxing and casing, one face of said wear plates entering said grooves and engaging said roller bearings, means to adjust one of said wear plates, a spring secured to the upper end of the boxing, and means to adjustably attach the ends of the spring to the frame.

2. The combination with a vehicle frame and a supporting axle, of a boxing slidably attached to said frame, a spring attached to the upper end of said boxing, clevises attached to the ends of said spring, links movably engaged with said frame, bolts extending vertically through the adjoining parts of the links and clevises and nuts engaging the ends of said bolts for positioning said links and clevises toward or from each other whereby the tension of the spring may be increased or decreased.

3. The combination with a vehicle frame, a supporting casing depending therefrom and a supporting axle, of a boxing slidably mounted in said casing and adapted to receive said axle, said boxing having an elongated slot through which said frame extends, a spring attached to that portion of the boxing above the frame, means to adjustably attach the ends of the spring to the frame, wear plates between said boxing and casing, roller bearings carried by the boxing for engagement with one face of the wear plates, and means to adjust one of the wear plates to take up any play between the wear plates and boxing.

In testimony whereof I have signed my name to this specification in the presence of two subscribing witnesses.

WALTER W. LOWDEN.

Witnesses:
C. L. PEPPER,
S. E. WISNER.

Copies of this patent may be obtained for five cents each, by addressing the "Commissioner of Patents, Washington, D. C."